Dec. 14, 1965 J. H. CYPHER ETAL 3,223,499
METHOD OF TREATING AND CONVEYING GLASS SHEETS
Filed June 4, 1962 7 Sheets-Sheet 1

INVENTORS
JAMES H. CYPHER
CHARLES R. DAVIDSON JR
BY
Oscar L. Spencer
ATTORNEY

Dec. 14, 1965  J. H. CYPHER ETAL  3,223,499
METHOD OF TREATING AND CONVEYING GLASS SHEETS
Filed June 4, 1962  7 Sheets-Sheet 2

INVENTORS
JAMES H. CYPHER and
CHARLES R. DAVIDSON JR
BY
Oscar H Spencer
ATTORNEY Dec. 14, 1965   J. H. CYPHER ETAL   3,223,499
METHOD OF TREATING AND CONVEYING GLASS SHEETS
Filed June 4, 1962   7 Sheets-Sheet 3

INVENTORS
JAMES H. CYPHER and
CHARLES R. DAVIDSON JR
BY
Oscar L Spencer
ATTORNEY United States Patent Office 3,223,499
Patented Dec. 14, 1965

3,223,499
METHOD OF TREATING AND CONVEYING GLASS SHEETS
James H. Cypher, New Kensington, and Charles R. Davidson, Jr., Tarentum, Pa., assignors to Pittsburgh Plate Glass Company, Pittsburgh, Pa., a corporation of Pennsylvania
Filed June 4, 1962, Ser. No. 199,901
12 Claims. (Cl. 65—25)

This application is a continuation-in-part of our co-pending application Serial No. 142,570, filed October 3, 1961, now abandoned, and assigned to the assignee of this application.

This invention relates to the treatment of glass and more particularly to heating of glass and to the transportation and/or support of hot glass sheets, especially glass at deformation temperature.

Sheets of glass may be fabricated through known manufacturing techniques of bending, tempering, annealing or coating and combinations of such techniques to form end products having characteristics and uses different from the original product. A common feature of these techniques is the heating of glass sheets to a temperature above that at which the major surfaces or the contour thereof will be changed by a deforming stress or contact with solids, hereinafter referred to as deformation temperature. For most plate and window glass this temperature is around 980 degrees Fahrenheit and above, but usually below a temperature at which the glass becomes molten.

Economic utilization of fabricating equipment requires that the glass sheets undergoing treatment be conveyed while hot.

The necessity of conveying glass at high temperature has heretofore resulted in undesirable deformation or marring of the major surfaces of glass sheets being treated due to physical contact with supporting and conveying apparatus while the glass is at elevated temperatures. Where glass is conveyed upon metal rolls and heated by radiant heaters, the transparency of the glass to a large portion of the radiant heat results in the overheating of the metal rolls. When the glass sheets come in contact with the heated rolls, localized surface melting often occurs. In addition, scale from the metal rolls is often imbedded into the softened surface of the glass sheets. These defects are known as "roll burn" and impair the quality of the finished products. The instant invention overcomes these defects common to the known methods of heat treating glass sheets.

In accordance with an embodiment of this invention, glass sheets are processed through a system consisting of a preheat section wherein the glass is conveyed on rollers between radiant heaters to preheat the glass until brought to a suitable preheat temperature lower than, or approximating, the deformation temperature of the glass; a gas film support heating section where the glass parts are transferred to, and supported on, a film of hot gas while being conveyed through a frictional drive which contacts the edges only of such parts, supplemental heat being supplied by radiant heat sources above and below the glass until the glass reaches a temperature above the deformation temperature and sufficiently high for subsequent processing; a quenching section where the glass is rapidly chilled while suspended between opposed flowing films of cool air, edge contact driving being continued through the section; and a delivery roll system which receives the tempered or otherwise processed glass parts from the quenching system and conveys them to their next destination.

It has been found that roll burn, which sometimes occurs in the preheat section in the manner previously described, may be eliminated by bowing the glass sheets convexly upward during the preheat so that only edge contact is maintained between the glass sheets and the conveying rolls. This bowing is accomplished by applying heat at a greater rate to the top surface of the glass sheet than to the bottom surface.

More particularly, the present invention contemplates a system wherein the glass sheets are heated on a roller conveyor in a preheat section to a temperature approximating the deformation temperature of the glass under imbalanced conditions imposed by maintaining a radiant heat source above the glass sheets at a higher temperature than a radiant heat source below the glass sheets. In this manner, a nonsymmetrical thermal gradient will be produced through the thickness of the glass, thereby creating a nonsymmetrical stress distribution causing temporary strain which bows the glass sheets convexly upward. While this imbalance in heat input is maintained, the glass sheets are conveyed by edge contact only upon the rolling supports of the preheat section to the gas support bed where a flow of heated gas provides a supporting film upon which the glass is conveyed by rotating disks in edge contact only with each sheet. While supported entirely upon the gas film, the temperature of the glass is raised to above the deformation temperature while the imbalanced condition is maintained. At these higher temperatures, the stress previously created in the glass sheets relaxes through viscous flow of the glass, and the glass sheets then conform to the pressure profile and contour of the support bed. Thereafter, and while the glass sheets are still supported on the gas film, the heat input to the glass is adjusted to substantially balanced conditions, thereby establishing substantially isothermal conditions through the sheets prior to subsequent processing.

The attendant advantages of this invention and the various embodiments thereof will be readily appreciated as the same become better understood by reference to the following detailed description when considered in connection with the accompanying drawings in which:

FIG. 1 is a perspective, partly schematic, view illustrating a system for conveying, heating and quenching sheet glass parts embodying several features of the present invention; FIG. 1A is another partly schematic perspective view on a larger scale illustrating particularly how sheet glass parts are driven by discs contacting an edge of the part while it is otherwise supported entirely by a gas film over the inclined bed of FIG. 1;

Figure 1:
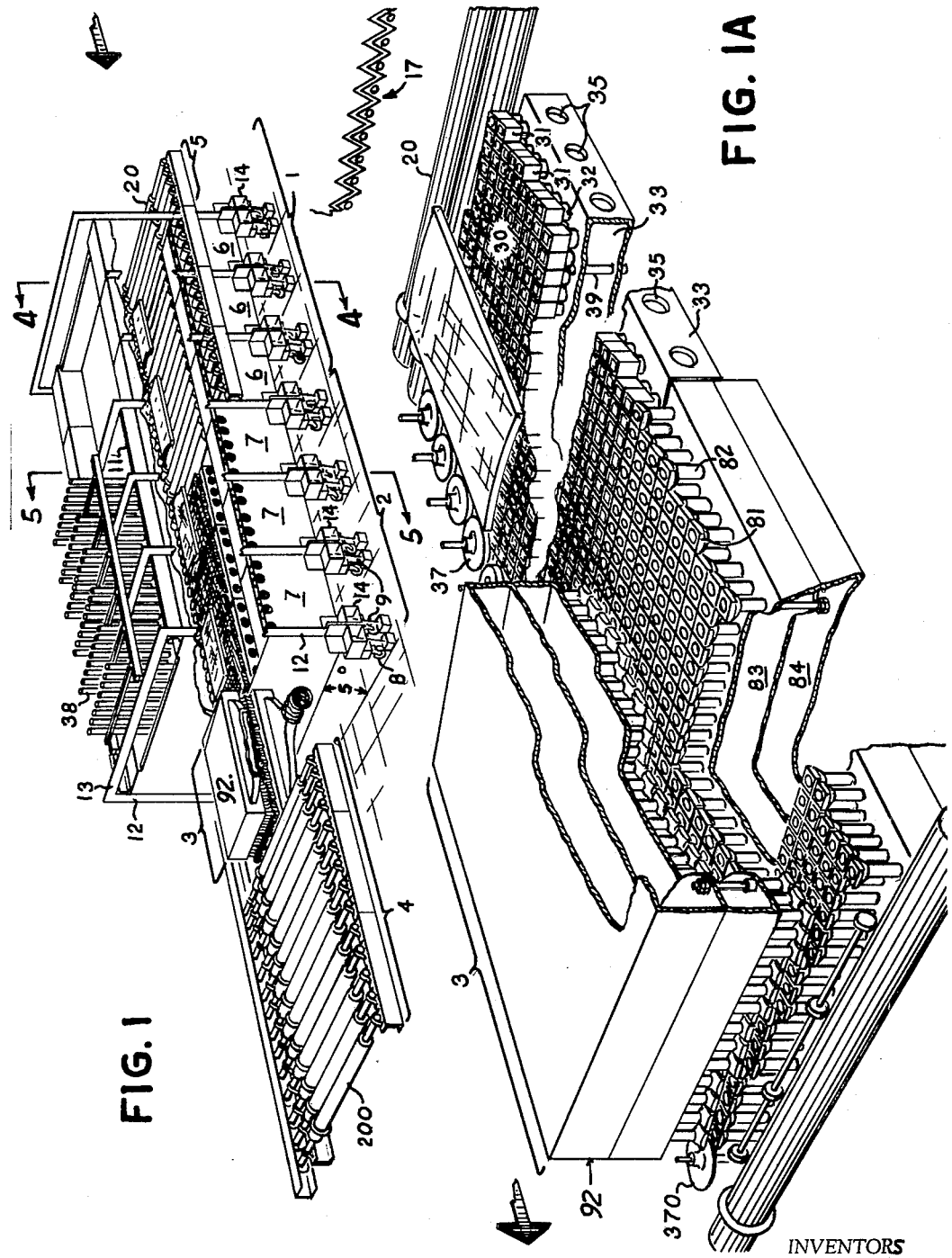

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consist of a preheat section 1 wherein the glass is conveyed on rollers between radiant heaters to preheat the glass until brought to a suitable preheat temperature under the deformation temperature; a gas film support heating section 2, where the glass parts are transferred to, and supported on, a film of hot gas while being conveyed through a frictional drive contacting the edges only of such parts, supplemental heat being supplied by radiant heat sources above and below the glass until the glass reaches a temperature high enough for tempering purposes; a quenching section 3, where the glass is rapidly chilled while suspended between opposed flowing films of cool air, edge contact driving being continued through the section, and a delivery roll system 4 which receives the tempered glass parts from the quenching system and conveys them to their next destination.

Preheat section 1 includes an apron roll unit 5 for loading, the first few rolls being idle and the last driven. Next in order of the direction of travel of the workpiece are three identical enclosed preheat units 6 followed by three enclosed hot gas support heating units 7, the quenching section 3 and the delivery section 4.

For ease in fabrication, all units 5, 6, 7 and sections 3 and 4 are assembled within rectilinear frameworks of support and mounted on casters 8 for convenience in assembly. Each unit and section is elevated from the casters 8 by jacks 9 into a position with the surfaces of all rolls and the gas support beds in a common plane tilted in a sidewise direction at an angle of five degrees with respect to the horizon as shown in FIGS. 1, 2, 6 and 7. The essential framework consists of girders 11, stanchions 12, and beams 13 resting on support blocks 14.

*The prehent section*

Figure 4:
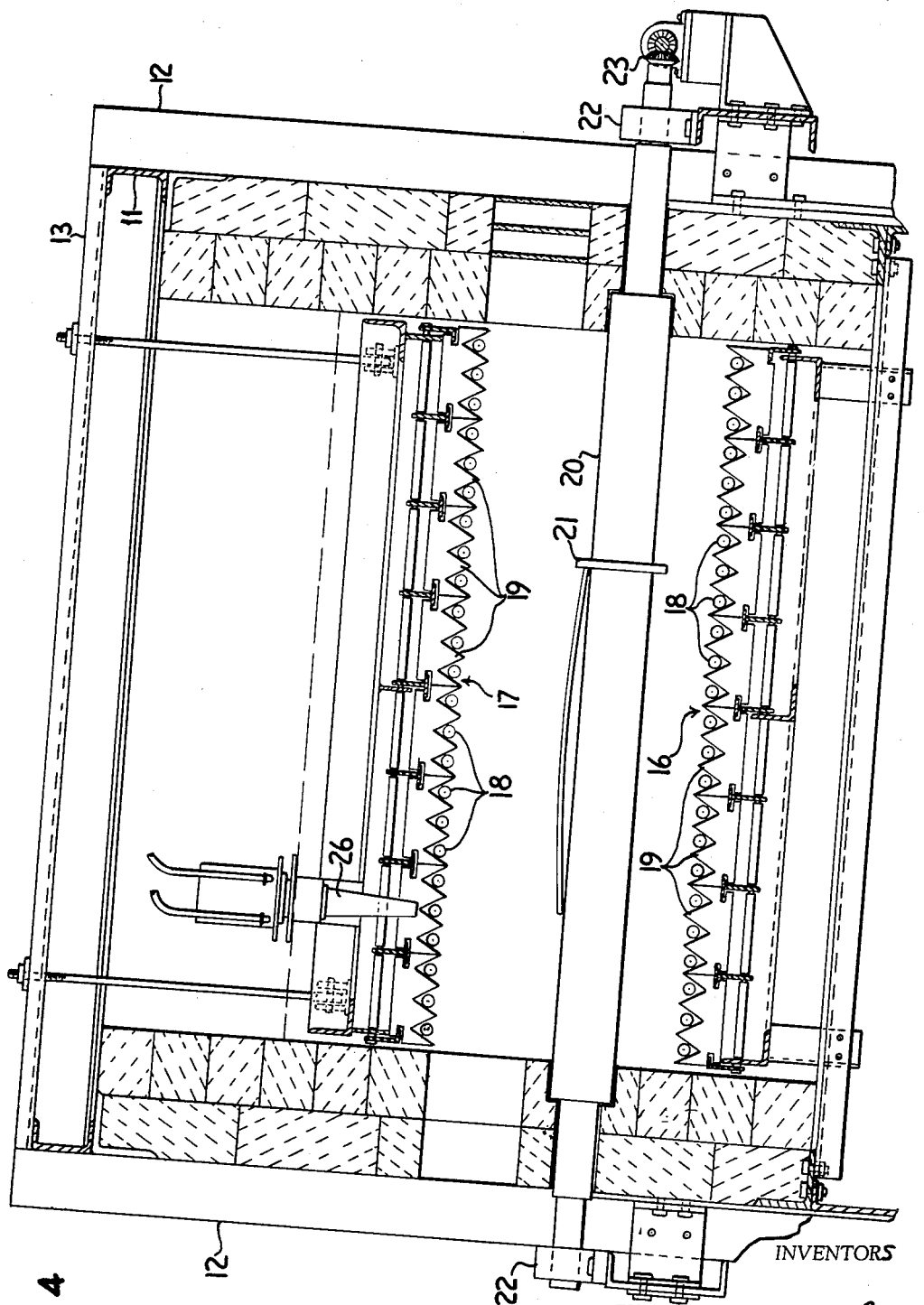
FIG. 4 is an end elevation partly in section taken along the line 4—4 of FIG. 1 and schematically showing how the glass is bowed as it is conveyed in the preheat section.
Figure 5:
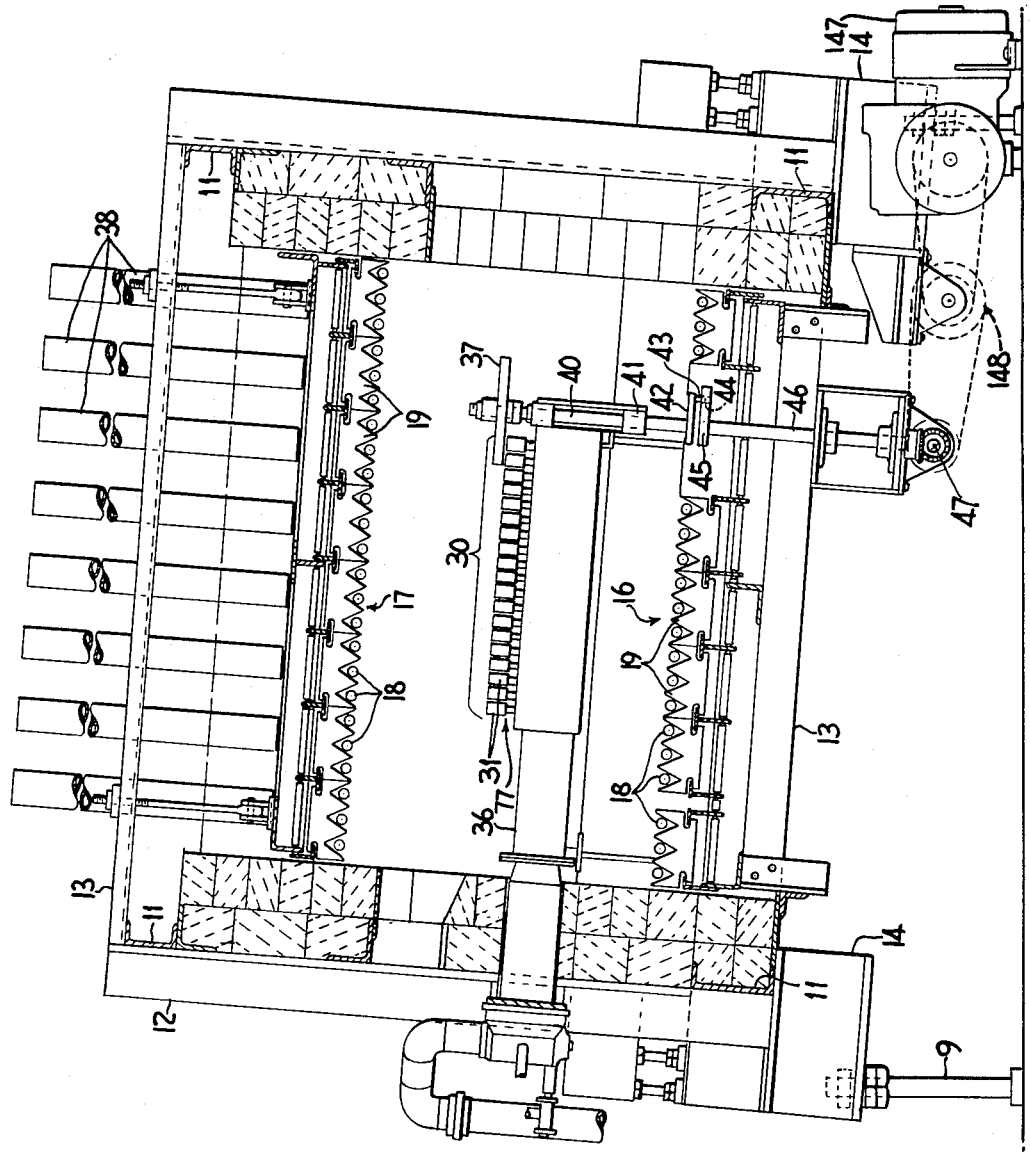
FIG. 5 is a detailed view partly in section and partly in elevation taken along the line 5—5 of FIG. 1.

Each unit 6 of the preheat section includes a radiant floor 16 and a radiant roof 17 built up from individual electrical heating units consisting of heating coils 18 disposed in ceramic holders 19. Control is afforded so that each unit 6 may be regulated as to temperature across the path of travel and parallel thereto. Each unit is provided with a thermocouple (not shown) to sense the temperature of the unit and the glass and to actuate the unit to the extent necessary to supply the required amount of heat. Conveyor rolls 20 are provided with guide collars 21 in alignment throughout the section 1 so as to position the glass properly for transfer to the gas support next following. Each roll is journaled in bearings 22 and is driven through gears 23 from a common shaft 24 energized by drive motor 25. Temperature sensing devices 26 (FIG. 4) placed at intervals along the path of travel of the workpiece afford data from which to establish control.

*Gas film support heating section*

Figure 2:
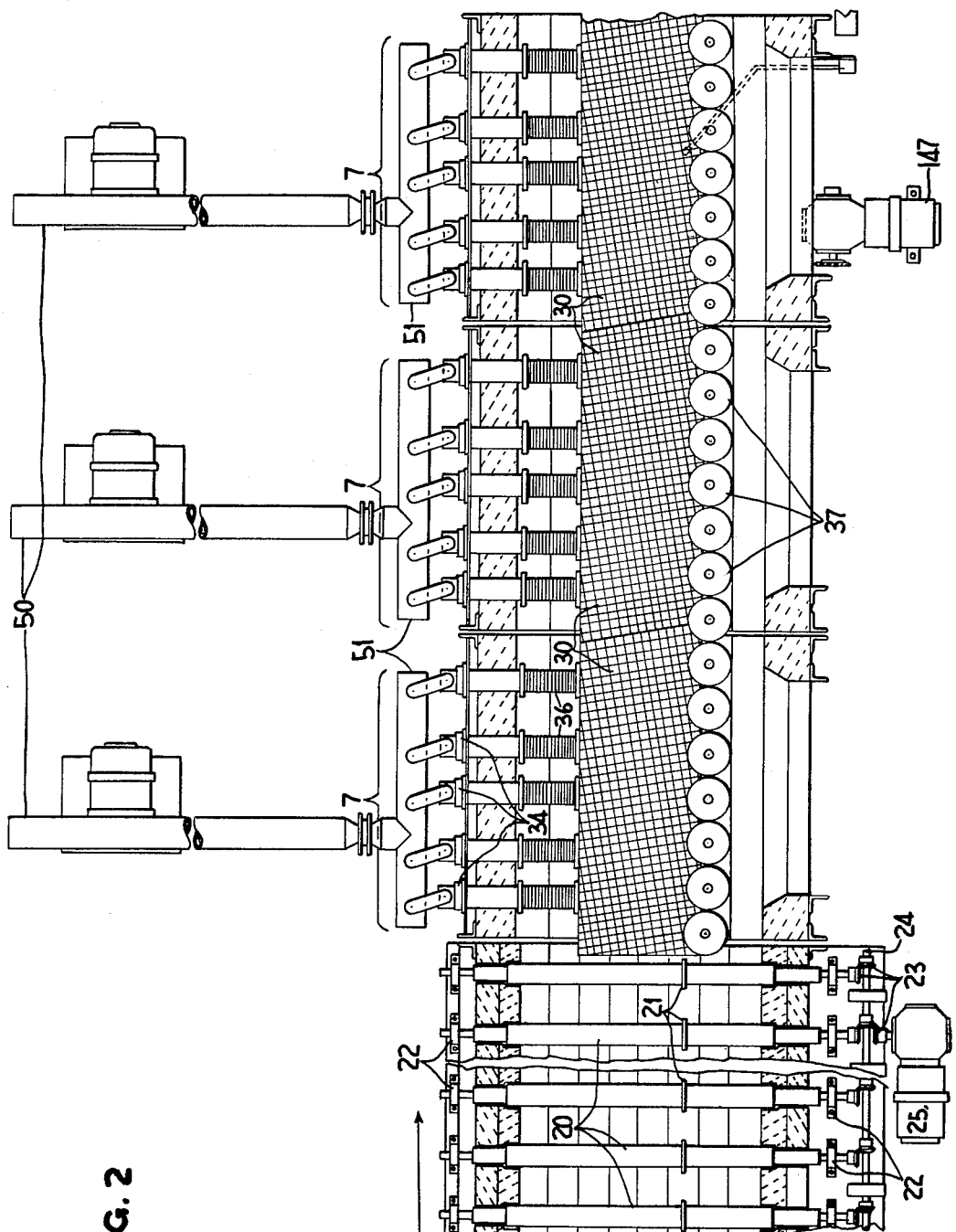
FIG. 2 is a partial plan view showing the arrangement of the preheat section with respect to the gas film support heating section and the mechanism for conveying glass sheets by edge contact only.

As reflected in FIGS. 1 and 2, the gas film support heating section 2 is made up of three similar contiguous units 7, each fabricated within a supporting framework like the preheating units 6 and each having generally similar radiant floor 16 and roof 17 sections with heating coil units 18 susceptible of control by thermocouples in increments across and lengthwise of each unit.

As shown generally in FIGS. 1A, 2, 3 and 5, each unit 7 includes a flat bed 30 of modules 31 in spaced but close juxtaposition each to the other and arranged geometrically like a mosaic. In the embodiment illustrated, all modules 31 have their upper termini of rectangular configuration and lying in a common plane. The modules 31 are arranged in successive rows crossing the intended path of travel of the workpiece, each row being at an angle other than 90 degrees from the path and spaced close to the next adjacent row as hereinafter described in more detail.

Each module 31 has a stem 32 of smaller cross sectional area than the upper terminus and each opens into a plenum chamber 33 positioned below the bed 30 and acting as a support therefor. Each module is substantially enclosed and separated from other modules by an exhaust zone. The bed is adjusted to such level that the plane of the upper termini of the modules lies parallel to, but just below by approximately the height of the gap between the modules and the support height of the glass sheet, the plane defined by the upper surfaces of the conveying rolls 20 in a preheat section 6. At one side each plenum chamber 33 is in communication with five gas burners 34 through orifices 35 and flexible couplings 36. At the opposite and lower side of the bed 30 a series of uniform disk-like driving members 37 extend inwardly and just above the bed to frictionally engage one edge only of the workpiece and convey it along the bed in continuous straight line travel. A plurality of vents 38 project through the roof of each unit 7 to exhaust the interior to the atmosphere. Spaced intermittently in the bed 30 inboard of its margins are exhaust ducts 39 projecting through the floor of the plenum chamber 33 and communicating with the surrounding atmosphere in the furnace chamber thus serving to reduce the likelihood of pressure buildup in the central spaces between the modules 31 during the time when a workpiece overlies any substantial area of the bed. In addition, an exhaust channel 77 surrounding the module stems and disposed between the modules and the plenums provides exhaust paths to the sides of the module beds and hence to the surrounding atmosphere. Driving members 37 (FIG. 5) are mounted on shafts 40, journals 41 for which are supported by the supports for the plenum chambers. Each shaft 40 is driven through a coupling consisting of a crank arm 42 and pin 43, engaged by a slot 44 in cam 45, in turn rotated on shaft 46 which is geared to drive shaft 47. Drive shaft 47 is driven by motor 147 through a chain drive 148.

Figure 6:
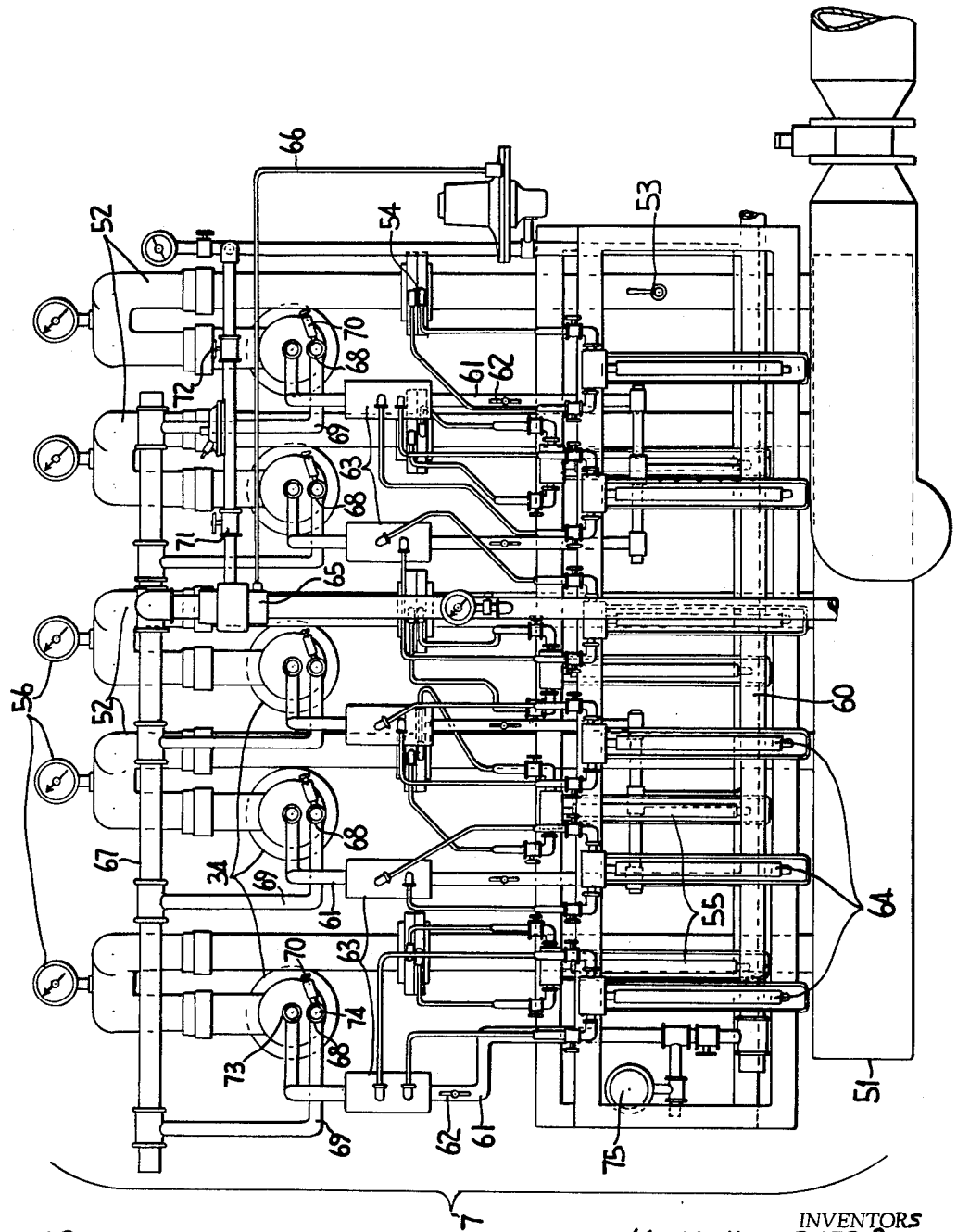
FIG. 6 is an elevation of the burners, gas and air feeds and controls for one of the three plenum chambers of the gas support heating section.

To supply air under pressure to the hot gas support combustion system, each unit 7 (FIG. 2) employs a blower 50 feeding air under pressure through a butterfly control to a manifold 51. As best shown in FIG. 6, the individual burners 34 are supplied with air from the manifold through conduits 52, each provided with a valve 53 and an orifice at 54 of known size. Pressure drop across each orifice can be measured by manometers 55 affording means to determine individual flow rates. Pressure gauges 56 permit balancing of static pressures in the air flowing to the burners.

Gas from main 60 is introduced into each burner 34 via conduits 61 each individually valved as at 62 and provided with flow metering devices 63 connected to manometers 64.

Each burner 34 is of the so-called direct fired air heater type. Air from blower 50 is tapped into premixer 65 and there mingled with gas supplied through pipe 66 from the main 60 from whence the mixture flows to a manifold 67 connected to burner pilots 68 by inlets 69. Each pilot 68 is provided with a continuous type spark plug 70 for ignition and safety against blowouts in addition to which each burner contains a glow tube (not shown) which remains incandescent during operation to sustain flame within the burner. Gas to the pilot premixer is controlled through needle-valve 71 and shut-off valve 72. Sight ports 73 and 74 permit visual independent inspection of the pilot flame and main flame, respectively, in each burner. Diaphragm-type safety devices 75 act to shut off all gas and air in the event of loss of either gas or air supply pressure.

The combustion of the products in the combustion chamber produces sufficient plenum pressure to supply the modules with heated gas of a uniform temperature and pressure. Adequate control of pressure and temperature are provided by correlating the rates of input of air and fuel to the burners. To supply enough gas to effect the desired support under normal conditions, an excess of air (usually 50 percent or more in excess) over that required for the combustion of the fuel gas is used. The supply of gas may be varied to change the heat input and the supply of air may be varied to change the pressure in the plenum.

The modules and plenum chamber are, in most cases, made of metal, such as iron, or like material having high heat conductivity, and the modules themselves are in good heat conductive relationship to the plenum chamber, being connected thereto.

Quenching section

Next adjacent the gas support heating section 2 in the direction of travel of the workpiece is quenching section 3. Separating the two is a partition 79 of asbestos board or the like for the purpose of segregating, as far as possible, the hot environment of heating section 2 from the cool environment of quenching section 3. An opening, not shown, in partition 79 is provided of such size and shape as to permit transfer of the workpiece from heating section 2 to quenching section 3 with minimum transfer of heat between the two sections.

Figure 3:
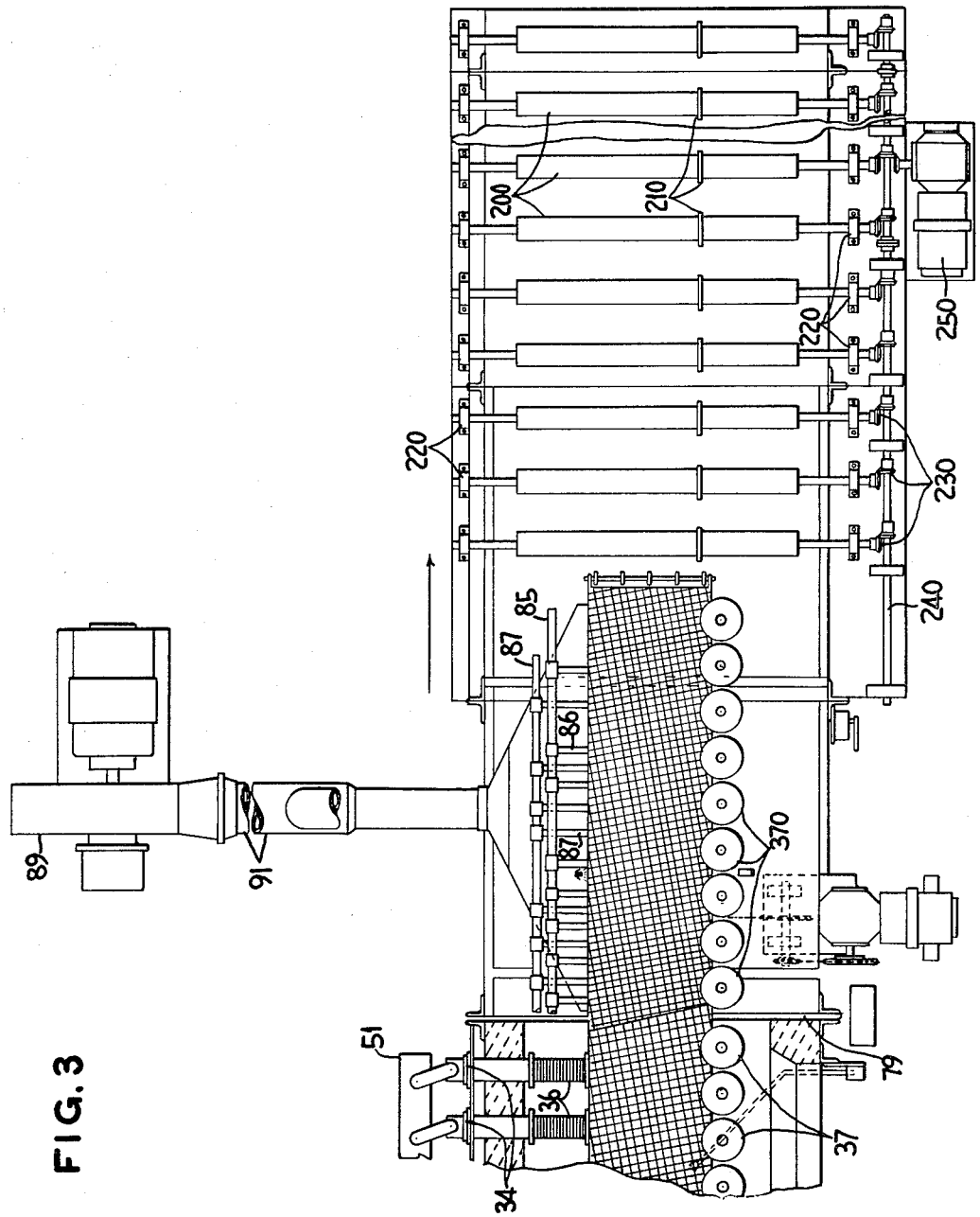
FIG. 3 is a partial plan view which is, in effect a continuation of FIG. 2 and shows the terminus of the gas film support heating section adjacent the quenching section, the latter being followed by the conveyor roll run out sections.

As shown in FIGS. 1A and 3, the quenching section 3 includes a flat bed of modules 80 arranged in mosaic pattern similar to that of the gas film support heating bed, but varying therefrom in certain respects hereinafter explained in detail. Each module 81 has a long stem 82 smaller in cross section than the upper terminus which projects through a cooling box 83 into a plenum 84, the cooling box and upper surface of the plenum acting as a support for the modules. The surface of the upper termini of the modules is adjusted to such level that it lies at the same level and in the same contour as that of the end portion of the gas film heating bed next preceding.

Heat exchange fluid, such as cooling water, from inlet manifold 85 is introduced into the heat exchange box 83 through a plurality of pipes 86 and discharged through pipes 87 into an outlet manifold 88. Relatively cool gas, such as air at ambient temperature is supplied to the plenum via blower 89 and duct 91.

Above the bed 80 and supported in such fashion as to be capable of being raised and lowered is a head assembly 92 (FIGS. 1 and 1A) which, in essence, constitutes a mirror image of the bed 80 and its associated heat exchange box 83 and plenum chamber 84 and which, in turn, is supplied separately with heat exchange fluid and air in like manner.

The conveying means for the quenching system includes disk-like driving members 370 (FIG. 1A) having a sufficiently narrow peripheral edge to extend inwardly and between the upper and lower module beds to frictionally engage one edge only of the workpiece and convey it along the bed in continuous straight line travel. Drive members 370 are mounted on vertical shafts and powered in the same manner as disks 37.

Delivery section

As shown in FIG. 1, the delivery roll section 4 consists of conveyor rolls 200 provided with guide collars 210 in alignment with disks 370 of the quench section to maintain the proper position of the glass during transfer therefrom. Each roll is journaled in bearings 220 and is driven through gears 230 from a common shaft 240 energized by drive motor 250.

Module design

In accordance with an embodiment of this invention, highly developed and refined supporting apparatus have been provided to prevent the distortion of glass at deformation temperature, an important achievement not accomplished by known conveying apparatus and processes, including known air film support devices. Specifically, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and hence a nonuniform supporting force. Furthermore, air introduced from a plurality of points beneath the supported glass must be exhausted beneath the supported area rather than merely by lateral flow to the glass edges to prevent a pressure buildup centrally of the supported sheet that will cause a doming effect upon the soft glass. The gas, having exhausted to points below the modules and adjacent the stems thereof, then flows principally to the sides of the bed through the exhaust channel 77 underneath the modules, some portion of the gas exhausting through ducts 39. This channel 77 is disposed underneath the modules, the module stems 32 which extend therethrough being long enough to provide adequate height to this space.

Of course, if the support zones are small in comparison with the exhaust areas, the support pressure will not be substantially uniform. If the exhaust areas are large in magnitude, thinner sheets of glass overlying these areas will have a tendency to sag. Conversely, if the support areas are too large and exhaust areas too small, doming of the glass tends to occur. Also, the pressure differential between the supporting pressure and the exhaust pressure must not be too great in order to avoid sagging.

Finally, it is important that the support be provided by a diffused and relatively small gas flow to provide substantially uniform pressure across the width of the support zone, thereby avoiding deformation, such as dimpling, from velocity pressure due to the direct impingement of localized jets of gas against the supported glass surface. Modules, as illustrated in FIG. 7, when assembled to form a supporting bed and suitably supplied with gas from a plenum chamber in a manner to be described in more detail, provide the uniform support required to process glass at elevated temperatures substantially free from distortion in the manner herein disclosed.

Figure 7:
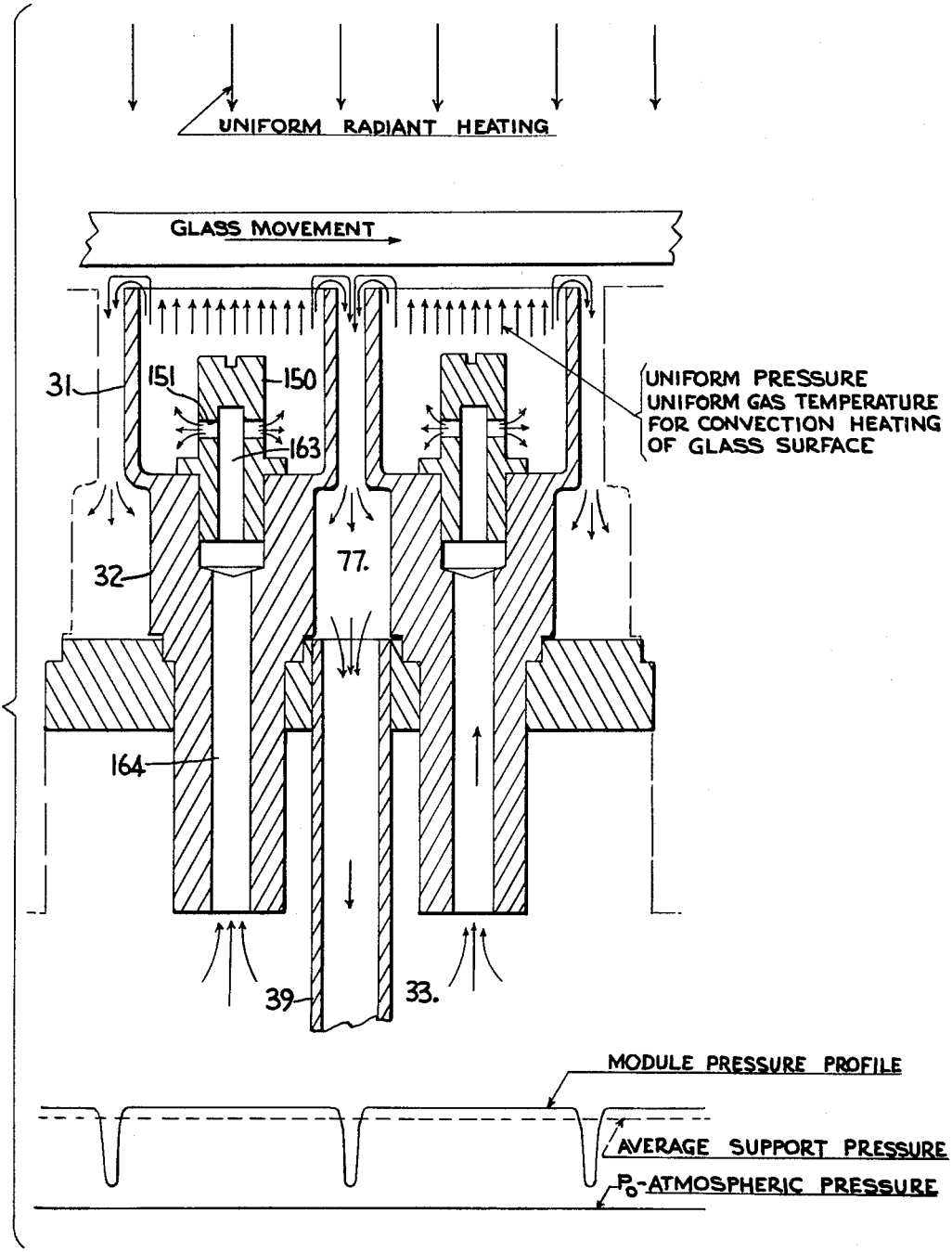
FIG. 7 is a schematic view on enlarged scale of a section of the gas support bed showing diagrammatically the flow and exhaust of the support gases and presenting diagrammatic graphs in conjunction therewith.

As indicated by the embodiment depicted in FIG. 7, each module 31 forms an open-topped chamber, being essentially closed on its other sides, the upper terminus of which defines a zone of substantially uniform pressure (a profile of which is diagrammatically shown) beneath the overlying glass. The pressure is exerted by gas supplied to each module from the supporting plenum chamber by way of the hollow supporting stem 32. A nozzle 150, in threaded engagement with an opening 162 in the base of the module 31 and having a bore 163 connected with the bore 164 of module stem 32, provides a gas inlet to the module chamber and also functions to diffuse the gas by changing the direction of flow to a horizontal direction as the gas escapes and expands into the module chamber through a plurality of bores or orifices 151 in the nozzle. The orifices 151 are so disposed to prevent direct impingement of pressurized gaseous fluid against the supported glass surface so as to prevent dimpling of the glas from the velocity pressure of a localized jet of gas. They deliver the gas to the module in a path which is initially out of the path of the glass. As shown in FIG. 7, the initial path is toward the module side wall below the upper edge thereof. However, the initial path may be downward, or as a horizontal spiral, or may be baffled or otherwise obstructed so long as it does not initially impinge against the glass. By feeding the support gas into the large module chamber through a conduit or orifice which is smaller in cross section than the module, the gas diffuses into the gas of the chamber, producing a diffused flow, thus ensuring uniform pressure across the upper edges of the module.

Operation

The following is an example, by way of illustration only, of a preferred mode of operation of the invention disclosed herein as applied to the treatment of glass sheets:

Sheets of glass one-quarter inch nominal thickness and approximately 16 inches wide by 27 inches long are placed lengthwise seriatim upon the apron roll unit 5, properly aligned by guide collars 21 and conveyed on rolls into and through preheat units 6 at a line speed of 1.3 inches per second. In this manner, an average of about 90 pieces of glass per hour are conveyed through the system. Electric heating coils 18 above and below the moving glass supply heat to the preheat section for approximately 15 feet of the glass travel. Throughout this section, the heating coils above the glass are maintained at a temperature of approximately 1600 degrees Fahrenheit and the coils below the glass are maintained at a temperature of approximately 1150 to 1250 degrees Fahrenheit. The temperature of the upper coils is adjusted transversely of the glass travel to apply more heat to the central portion of the glass sheet than to the side edges but is supplied substantially uniformly along the direction of glass travel. In this manner, the glass is rapidly bowed convexly upward in a cylindrical curve, the axis of which is in the direction of glass travel. The central portion of each sheet becomes spaced from the rolls approximately $\frac{1}{16}$ inch while contact with the rolls is maintained along the edges of the sheet longitudinally of the path of travel. The temperature of the glass reaches approximately 950 degrees Fahrenheit at the end of the preheat section.

As the leading edge of the glass sheet leaves the last roll of the preheat section and progressively covers modules 31 forming support bed 30, the sheet becomes partly and finally fully supported by the uniform pressure of the gas emitted from the modules. The magnitude of this gas pressure is never large and, in any event, is held low enough and uniform enough from module to module so that it does not cause deformation of the glass. Because the modules offer little or no support when only partially covered with glass, the rows are oriented at an angle from normal to the path of travel so that the edges of the glass sheet are at all times supported at least at spaced positions. In addition, this orientation assures even heating of the glass by preventing some portions thereof from traveling the length of the heating section over only exhaust areas, as would be the case if the modules were aligned in the direction of glass movement. Once the glass becomes gas supported, it is conveyed by edge contact through frictional engagement of its lower edge with rotating drive members 37. For this purpose, the entire system is positioned in a common plane tilted at an angle of five degrees with respect to the horizon to provide the glass with a component of force normal to the driving disks.

Gas burners 34 are supplied natural gas and air in proportions by volume of approximately one to thirty-six, respectively, which includes 260 percent excess air over that required to provide complete combustion. The natural gas is provided at a rate of approximately 60 cubic feet per hour per square foot of bed. The product of combustion are introduced to the plenum chambers, producing therein a pressure of approximately 0.5 pound per square inch gauge. Each module includes orifices which reduce this pressure in the module cavities when they are covered with glass to about $\frac{1}{21}$ of the plenum pressure. Gas is introduced to the stem of each module at a temperature of 1200 degrees Fahrenheit and a volume flow of approximately 1.3 cubic feet per minute.

The module bed of this example is constructed of 120 modules per square foot of the type shown in FIGS. 21 and 22, and the upper terminus of each module forms a square, the outer sides of which are one inch long, the spacings between the walls of adjacent modules being $\frac{3}{32}$ of an inch. Each wall is $\frac{1}{16}$ inch thick. For each square foot of glass area, the bed construction used herein provides 0.64 square feet of gas supply area (i.e., internal area of module at its upper edge), 0.163 square feet of gas exhaust area, and 0.196 square feet of module wall area separating the supply areas from exhaust areas. The nominal module support pressure, when covered by the quarter-inch-thick glass, is 0.023 pound per square inch above that existing above the glass which provides nominal spacing of 0.010 inch between the underside of the gas film supported glass and the upper terminus of the module wall. The nominal exhaust pressure is substantially one atmosphere absolute.

To heat the glass, heat is added convectively and radiantly from the supporting gas which is at a temperature of approximately 1200 degrees Fahrenheit, and is added radiantly into the chamber from ceiling heating coils 18 of the first unit 7 at a temperature of approximately 1600 degrees Fahrenheit and thereafter at a temperature of approximately 1300 degrees Fahrenheit. The temperature of the glass is sufficiently elevated in the first unit to permit the relaxation of the stress which produces the bowing and the glass flattens to the contour of the support bed. By the time each sheet travels through the 15-foot length of the heating section, the temperature of the glass is approximately 1200 degrees Fahrenheit and the sheet is in a substantially isothermal condition. Floor coils 18 beneath the plenum chambers supply heat at about 1300 degrees Fahrenheit to help maintain the ambient heat level in the furnace chamber and keep the plenum boxes hot. These coils may also supply heat to the module walls through conduction from the plenum box.

In the quenching section, to which the glass is conveyed from the heating section, the surfaces of each sheet are rapidly cooled to establish a large thermal gradient between the center of the sheet and the surfaces. Air at an ambient temperature of approximately 100 degrees Fahrenheit is supplied to upper and lower plenum chambers to provide plenum pressures of 1.37 and 0.75 pounds per square inch, respectively. Each module includes orifices which reduce this pressure to about $\frac{1}{8}$ of the plenum pressure as the air escapes into the module cavities. The air is emitted at rates of 2.0 and 1.5 cubic feet per minute per module above and below the glass, respectively. Water is circulated through cooling boxes 83 at a flow rate of 1 gallon per minute per square foot of bed, the inlet temperature of the water being about 60 degrees Fahrenheit and outlet temperature being about 80 degrees Fahrenheit. Each quench module bed of this example is formed of one-inch square modules, as shown in FIG. 1A and similar to the module shown in FIG. 7 but having a circular internal configuration and thicker module walls. These modules are evenly spaced from each other to provide 102 modules per square foot. For each square foot of glass area, there is provided 0.24 square feet of cold air supply area, 0.29 square feet of exhaust area and 0.47 square feet of module wall area. The gap between walls of the adjacent modules is $\frac{3}{16}$ of an inch. The average spacings of the glass from the lower and upper module surfaces measured to the opposed glass surface is 0.010 inch and 0.050 inch, respectively. The overall heat transfer coefficients above and below the glass are equal and about 81 British thermal units per square foot per hour per degree Fahrenheit. Of the heat removed, convection accounts for approximately 80 percent, conduction and radiation accounting for the remainer.

The module rows of the quenching section are oriented at a slight angle, usually 3 to 45 degrees and in this case 10 degrees, from normal to the path of travel to support the edges of the glass in the manner explained with respect to the heating section, and to assure even cooling of the glass over the entire surface thereof to minimize the formation of an iridescent stress pattern in the glass.

The glass travels through the 7 feet of the quench zone in approximately 30 seconds. In the initial 15 seconds, the temperature of the glass is lowered through the annealing range. In the remaining 15 seconds, the temperature of the glass is lowered to approximately 600 degrees Fahrenheit. The glass, at this point being no longer deformable, is conveyed from the air support of the quenching system to the rolls of the delivery system by disks 370 and thence to their next destination.

Quarter-inch thick glass so tempered has a stress, in terms of the center tension thereof as indicated by the birefringent effect of the glass on polarized light waves, of approximately 3200 millimicrons per inch of glass length as measured by standard techniques using a polariscope.

While the operating example disclosed above illustrated an embodiment of this invention, in many instances it is possible to alter these values or constituents or substitute equivalents therefor to obtain substantially the same results in substantially the same way.

Within the contemplated module and support bed design, variations in module size, construction and spacing may be made which result in a change of actual and relative support areas, module wall areas, and exhaust areas as well as in the actual and relative gas pressures utilized for support. Banks or sections of modules may be spaced from each other and horizontal rolls extending transversely of the path of travel may be disposed between these sections so as to contact the lower surface of the glass sheets to frictionally drive and/or partially support the sheets. Of course, the ultimate test of acceptable variations is the success of the arrangement in supporting glass in a uniform manner and without deformation at temperatures above the deformation temperature of the glass.

It is necessary that heat be applied to both major surfaces of the glass sheets undergoing processing to control the bowing or warpage of the sheets. This has been accomplished, as disclosed in the specific example illustrating the operation of the invention, by independently controllable heat sources on each side of the glass sheet. Gas heaters may be substituted for the electric heaters in the preheat section and in the roof of the heating section, as long as effective heat control is maintained. The heaters are actuated by thermocouples (not shown) which turn the heaters or a portion of them on and off as the load on the system demands. Similar radiant heat sources are disposed in other portions of the furnace to accomplish the same result and/or to maintain the required temperature in such other portions.

The extent to which the glass sheets bow must be sufficient to prevent the central portion of the sheets from contacting the rolls. However, the sheets must not be bowed so much that difficulty is encountered in transferring the sheets from the rolls of the preheat to the gas support bed of the heating section. Too great a bow in the sheets will result in insufficient gas support and an accompanying edge contact between the glass and the module bed. It has been found that the distance between the central portions of the sheets and the upper surfaces of the rolls should be greater than 0.002 inch to prevent roll contact but should be preferably less than 0.25 inch and in any event no greater than 0.50 inch to facilitate their transfer to and support on the module bed. Because the heat imbalance controls the radius of curvature of the glass sheet, this imbalance must be correlated with the sheet dimensions to provide the proper clearance.

While in the process described the glass sheets are to be bowed in a cylindrical form by supplying a greater amount of the top heat centrally of the path of travel, it is also acceptable to utilize uniform top heating. Where this is done, it will be found that the glass bows both longitudinally and transversely of the path of travel and assumes a pillow-like configuration. No operational difficulties will be encountered, however, as long as the distance between the central portions of the sheets and the upper surfaces of the rolls is maintained within the limits specified above.

It should be evident from the above section that while in the foregoing disclosure certain preferred embodiments of the invention have been disclosed, numerous modifications or alterations may be made therein without departing from the spirit and scope of the invention as set forth in the appended claims.

We claim:

1. In a method of treating a glass sheet, the steps comprising supporting said sheet on rolling supports, moving said sheet along a path of travel formed by said rolling supports, differentially supplying heat to the supported and unsupported side so as to bow the central portion of the glass sheet out of contact with the rolling supports, then supporting the glass sheet upon a fluid pressure, and increasing the temperature of the glass sheet to remove the bow.

2. In a method of treating glass sheet, the steps comprising supporting and conveying the glass upon rolling supports, heating the glass in a manner which bows the glass, and thereafter at least partially supporting and conveying the glass upon gas while raising the temperature of the glass until the bow disappears.

3. In a method of treating glass, the steps comprising conveying sheets of glass upon rolling supports, subjecting the glass sheets to an imbalanced heat input, one side to the other, so as to bow the central portion of the sheet away from said rolling supports, thereafter supporting and conveying said glass sheets upon a fluid while maintaining an imbalanced heat input, said one side to said other, and increasing the heat input to the glass at least until the bow disappears.

4. The method of claim 3 including the further step of adjusting the heat applied to the glass to thereafter substantially balance the heat input thereto.

5. In a method of treating glass, the steps comprising conveying sheets of glass upon rolling supports, subjecting the glass sheets to an imbalanced heat input, one side to the other, so as to bow the central portion of the sheet away from said rolling supports, a distance less than about 0.5 inch and more than about 0.002 inch, thereafter supporting and conveying said glass sheets upon a fluid pressure while maintaining an imbalanced heat input, said one side to said other, and increasing the heat input to the glass at least until the bow disappears.

6. In a method of conveying and heating glass sheets, the steps comprising supporting the sheets on rollers and conveying them along a first portion of a predetermined path, applying heat at a greater rate to the unsupported surface than the supported surface of the glass to bow the central portion of the sheet out of contact with the rollers, conveying the glass sheets along a second portion of said predetermined path, at least partially supporting said glass by fluid pressure, and decreasing the rate at which heat is applied to the unsupported surface and increasing the rate at which heat is applied to the supported surface while increasing the total heat applied to the glass until the bow disappears.

7. In a method of treating a glass sheet, the steps comprising supporting and conveying the glass sheet upon rolling supports, bowing the glass sheet convexly away from the rolling supports so that contact therebetween is maintained substantially along the edges only of the glass sheet and thereafter at least partially supporting and conveying the glass sheet upon a fluid while heating said glass at least until the bow disappears.

8. In a method of transporting and heating a sheet of glass, the steps comprising supporting and transporting said sheet upon rolls, radiantly heating said sheet, applying the radiant heat to the nonsupported surface of said sheet at a sufficiently greater rate than to the supported surface to bow the central portion of the sheet away from the rolls, transferring the bowed sheet from the rolls to a fluid support, at least partially supporting said sheet upon a fluid while initially maintaining said bowed condition, heating said sheet convectively at the supported surface at a greater rate than heat is supplied to the unsupported surface, and further elevating the temperature of said sheet until the bow disappears.

9. The process of claim 2 wherein the bowed glass is further heated while supported on its edges by said rolling supports before it is at least partially supported by gas at least until the bow disappears.

10. In the art of heat treating substantially horizontally disposed glass sheet while it is conveyed in a substantially horizontal direction in direct sequential contact with successive conveyor elements longitudinally of and extending transversely of a path of glass movement, the improvement which comprises differentially heating the top and bottom surface of the sheet to bow the glass into a convex elevational configuration transversely of its path of movement and conveying the bowed glass sheet along said conveying elements while it is supported along side edges thereof by said conveyor element and the central area of the glass is out of engagement with said elements, further heating the glass while it is so supported and thereafter at least partially supporting the bowed glass upon gas and heating the glass until the bow disappears.

11. The process of claim 10 including the step of removing the bow in the resulting hot glass sheet by at least partially heating the glass on gas and adjusting the heat balance on opposite sides of the glass while thus supported until the bow disappears.

12. The process of claim 5 wherein the bowed glass sheet is further heated while supported on its edges by said rolling supports before it is supported and conveyed upon fluid pressure.

References Cited by the Examiner

UNITED STATES PATENTS

| | | |
|---|---|---|
| 756,600 | 4/1904 | Dodge. |
| 820,205 | 5/1906 | Keighley _____ 65—176 |
| 1,622,817 | 3/1927 | Waldron _____ 65—182 XR |
| 2,042,610 | 6/1936 | Littleton _____ 65—114 |
| 2,848,820 | 8/1958 | Wallin et al. |
| 2,985,986 | 5/1961 | Leflet _____ 65—107 XR |
| 3,048,383 | 8/1962 | Champlin _____ 65—182 XR |
| 3,062,520 | 11/1962 | Frey et al. _____ 65—182 X |

FOREIGN PATENTS 1,149,169    7/1957    France.

OTHER REFERENCES

Voided application 356,676, 1931, 65–182 (2 pages spec., 2 sheets dwg.), Mississippi Glass Co. (Great Britain).

HOWARD R. CAINE, *Acting Primary Examiner.*

DONALL H. SYLVESTER, *Examiner.*